(12) United States Patent
Suzuki et al.

(10) Patent No.: US 8,520,853 B2
(45) Date of Patent: *Aug. 27, 2013

(54) WIRELESS COMMUNICATION DEVICE, METHOD FOR WIRELESS CONNECTION, AND COMPUTER USABLE MEDIUM THEREFOR

(75) Inventors: Takanobu Suzuki, Aichi (JP); Satoko Ando, Aichi (JP); Takeshi Nagasaki, Aichi (JP); Hideki Nogawa, Aichi (JE)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 558 days.

This patent is subject to a terminal disclaimer.

(21) Appl. No.: 12/565,265

(22) Filed: Sep. 23, 2009

(65) Prior Publication Data

US 2010/0082978 A1     Apr. 1, 2010

(30) Foreign Application Priority Data

Sep. 30, 2008 (JP) .................................. 2008-255591

(51) Int. Cl.
*H04K 1/00* (2006.01)
*H04L 9/00* (2006.01)

(52) U.S. Cl.
USPC ........... 380/270; 713/168; 713/182; 713/183; 726/5

(58) Field of Classification Search
USPC ......... 713/168, 170, 171, 182, 183; 380/270; 726/5
See application file for complete search history.

(56) References Cited

U.S. PATENT DOCUMENTS

| 5,513,263 A | * | 4/1996 | White et al. | ................... 380/44 |
| 5,912,959 A | * | 6/1999 | Johnson | ....................... 379/188 |
| 6,084,968 A | | 7/2000 | Kennedy et al. | |
| 7,058,806 B2 | | 6/2006 | Smeets et al. | |
| 7,505,596 B2 | | 3/2009 | Duplessis et al. | |

(Continued)

FOREIGN PATENT DOCUMENTS

| EP | 1657855 A1 | 5/2006 |
| JP | 2004-023365 | 1/2004 |

(Continued)

OTHER PUBLICATIONS

Jiang Li, et al. "Encryption as an Effective Tool in Reducing Wireless LAN Vulnerabilities". Fifth International Conference on Information Technology: New Generations. IEEE Computer Society.

(Continued)

*Primary Examiner* — Edward Zee
*Assistant Examiner* — Baotran N To
(74) *Attorney, Agent, or Firm* — Banner & Witcoff, Ltd.

(57) ABSTRACT

A wireless communication device to be wirelessly connected to a wireless network is provided. The wireless communication device includes an encryption examiner to examine as to whether communication in the wireless network is encrypted, a password obtainer to obtain a password designated by a user for connecting the wireless communication device to the wireless network if the encryption examiner determines that the communication in the wireless network is encrypted, and a wireless connector to connect the wireless communication device to the wireless network with the use of the obtained password. The wireless connector sequentially selects one set from a plurality of sets, and sequentially attempts to connect the wireless communication device to the wireless network with the use of the sequentially selected one set. Each set of the plurality of sets has an authorization method and an encryption method.

11 Claims, 12 Drawing Sheets

(56) References Cited

U.S. PATENT DOCUMENTS

| | | | |
|---|---|---|---|
| 2005/0125693 | A1 | 6/2005 | Duplessis et al. |
| 2005/0148326 | A1 | 7/2005 | Nogawa et al. |
| 2006/0106918 | A1 | 5/2006 | Evert et al. |
| 2006/0246946 | A1 | 11/2006 | Moritomo et al. |
| 2007/0192596 | A1 | 8/2007 | Otsuka |
| 2008/0086760 | A1 | 4/2008 | Jiang et al. |
| 2008/0163343 | A1 | 7/2008 | Kudo |
| 2010/0182956 | A1 | 7/2010 | Moritomo et al. |
| 2010/0211777 | A1 | 8/2010 | Ishihara et al. |
| 2010/0329461 | A1 | 12/2010 | Duplessis et al. |

FOREIGN PATENT DOCUMENTS

| | | | |
|---|---|---|---|
| JP | 2004-180010 | | 6/2004 |
| JP | 2005-174134 | | 6/2005 |
| JP | 2005176320 | A | 6/2005 |
| JP | 2005-346310 | | 12/2005 |
| JP | 2006-141012 | | 6/2006 |
| JP | 2006-279848 | | 10/2006 |
| JP | 2006-309458 | | 11/2006 |
| JP | 2007-151195 | | 6/2007 |
| JP | 2008-165444 | | 7/2008 |
| WO | 2009/011055 | A1 | 1/2009 |

OTHER PUBLICATIONS

Wi-Fi Alliance, "Wi-Fi Certified for Wi-Fi Protected Setup: Easing the User Experience for Home and Small Office Wi-Fi Networks". XP-002567243.
Notification of Reasons for Rejection in corresponding Japanese Application 2008-255591, mailed Aug. 16, 2010.
European Communication/Examination Report dated Mar. 24, 2011 in European Application No. 09 252 274.7-2413.
Notification of Reasons for Rejection for Japanese Patent Application 2008-255591 mailed Feb. 8, 2011.
Notification of Reasons for Rejection in corresponding Japanese Application 2008-255591, mailed Aug. 18, 2010. (Corrected date of mailing.)
Extended EP Search Report dtd Feb. 22, 2010, EP Appln. 09252275.4.
Notification of Reasons for Rejection for Japanese Patent Application No. 2008-255586 mailed Aug. 18, 2010.
Jp Office Action dtd Feb. 8, 2011, JP Appln. 2008-255586, English translation.
Notification of First Office Action for Chinese Patent Application No. 200910204045.X dated May 23, 2012.
Notification of First Office Action for Chinese Patent Application No. 200910204044.5 dated May 23, 2012.
Non-Final OA Jan. 5, 2012, U.S. Appl. No. 12/565,202.
Notice of Allowance Jun. 21, 2012, U.S. Appl. No. 12/565,202.
Notification of Second Office Action issued in corresponding Chinese Patent Application No. 200910204045.X issued Feb. 7, 2013.
European Search Report for Application No. 09252274.7 dated Feb. 22, 2010.
Jiang Li, et al. "Encryption as an Effective Tool in Reducing Wireless LAN Vulnerabilities". Fifth International Conference on Information Technology: New Generations. IEEE Computer Society., Apr. 7, 2008, pp. 557-562.
Wi-Fi Alliance, "Wi-Fi Certified for Wi-Fi Protected Setup: Easing the User Experience for Home and Small Office Wi-Fi Networks". XP-002567243, published in 2007, pp. 1-14.
Office Action received in corresponding European Patent Application No. 09 252 274.7 dated Mar. 12, 2013.

* cited by examiner

DURING SSID SEARCH

| INSTALLATION OF WIRELESS SETTINGS |
|---|
| SEARCHING WIRELESS NETWORKS ••• |

FIG.4A

SELECTION OF SSID

| SELECT A WIRELESS NETWORK |
|---|
| <MANUAL INPUT> |
| SSID0001 |
| SSID0002 |
| SSID0003     ▽ |

FIG.4B

ENTRY OF NETWORK PASSWORD

| ENTER NETWORK PASSWORD |
|---|
| ENTER PRESET PASSWORD AND PRESS ENTER KEY<br>  ABCDEFG •••            ENTER |

FIG.4C

WIRELESS COMMUNICATION DEVICE, METHOD FOR WIRELESS CONNECTION, AND COMPUTER USABLE MEDIUM THEREFOR

CROSS REFERENCE TO RELATED APPLICATION

This application claims priority from Japanese Patent Application No. 2008-255591, filed on Sep. 30, 2008, the entire subject matter of which is incorporated herein by reference.

BACKGROUND

1. Technical Field

The present invention relates to a wireless communication device to be connected to a network and a method to connect the wireless communication device with a network.

2. Related Art

A wireless LAN (local area network) has been widespread and utilized in network computing environment. Hereinafter, the wireless LAN will be referred to as a wireless network. Specifically in the wireless network, security of information exchanged therein is often threatened. Therefore, in many cases, security in the wireless network is enhanced by authorization and encryption; a wireless communication device to be connected to the wireless network is required to be authorized, and information exchanged in the wireless network is encrypted. Methods for authorization include, for example, Shared-key authorization, WPA (Wi-Fi Protected Access)-PSK (Pre-Shared Key), and WPA2-PSK. Alternatively to these methods, the wireless network may operate in "open authorization" method, in which no authorization is required for communication. Methods for encryption include, for example, WEP (Wired Equivalent Privacy), TKIP (Temporal Key Integrity Protocol), and AES (Advanced Encryption Standard). Alternatively to these methods, the wireless network may operate in "no encryption" method, in which no encryption is required for communication.

When a wireless communication device is connected with the wireless network, the wireless communication device is required to have predetermined wireless settings installed. If the wireless network is protected by authorization and/or encryption, the wireless communication device is required to have the settings for the authorization/encryption methods installed.

The settings for authorization and encryption in the wireless network are often complicated and difficult for users to deal with. Therefore, easier methods to connect a wireless communication device with the wireless network have been sought. For example, WPS (Wi-Fi Protected Setup), which is a known technology to install wireless settings fully automatically, is suggested by Wi-Fi Alliance. The full-automatic installation reduces burden on users but requires the wireless communication device to be complied with the methods for automatic settings such as WPS.

SUMMARY

Thus, methods to easily install the settings for wireless communication, which require less burden on users, have yet been sought in the widespread wireless network environment.

In view of the above, the present invention is advantageous in that a wireless communication device, which can be connected to the wireless network easily with reduced burden on users, is provided. Further, a method to connect the wireless communication device to the wireless network easily is provided. Furthermore, a computer usable medium to store computer readable instructions to manipulate the wireless communication device to be connected with the wireless network is provided.

BRIEF DESCRIPTION OF THE ACCOMPANYING DRAWINGS

FIGS. 4A-4C are illustrative views of user interfaces to be presented to a user in the wireless settings installation process according to the first embodiment of the present invention.

DETAILED DESCRIPTION

Hereinafter, a first embodiment according to an aspect of the present invention will be described with reference to the accompanying drawings.

Firstly, an overall configuration of a network system including a wireless network 10 according to the embodiment of the present invention will be described. The wireless network 10 includes an access point 300A and an MFP (multifunction peripheral) 100. The MFP 100 is equipped with a plurality of functions to, for example, print, scan, and/or copy images. The MFP 100 is connected to a PC (personal computer) 400 within the wireless network 10 through the access point 300A, a wired LAN 600, and a hub 620. The MFP 100 can receive print data transmitted from the PC 400 to print and transmits image data representing a scanned image to the PC 400.

Figure 2:
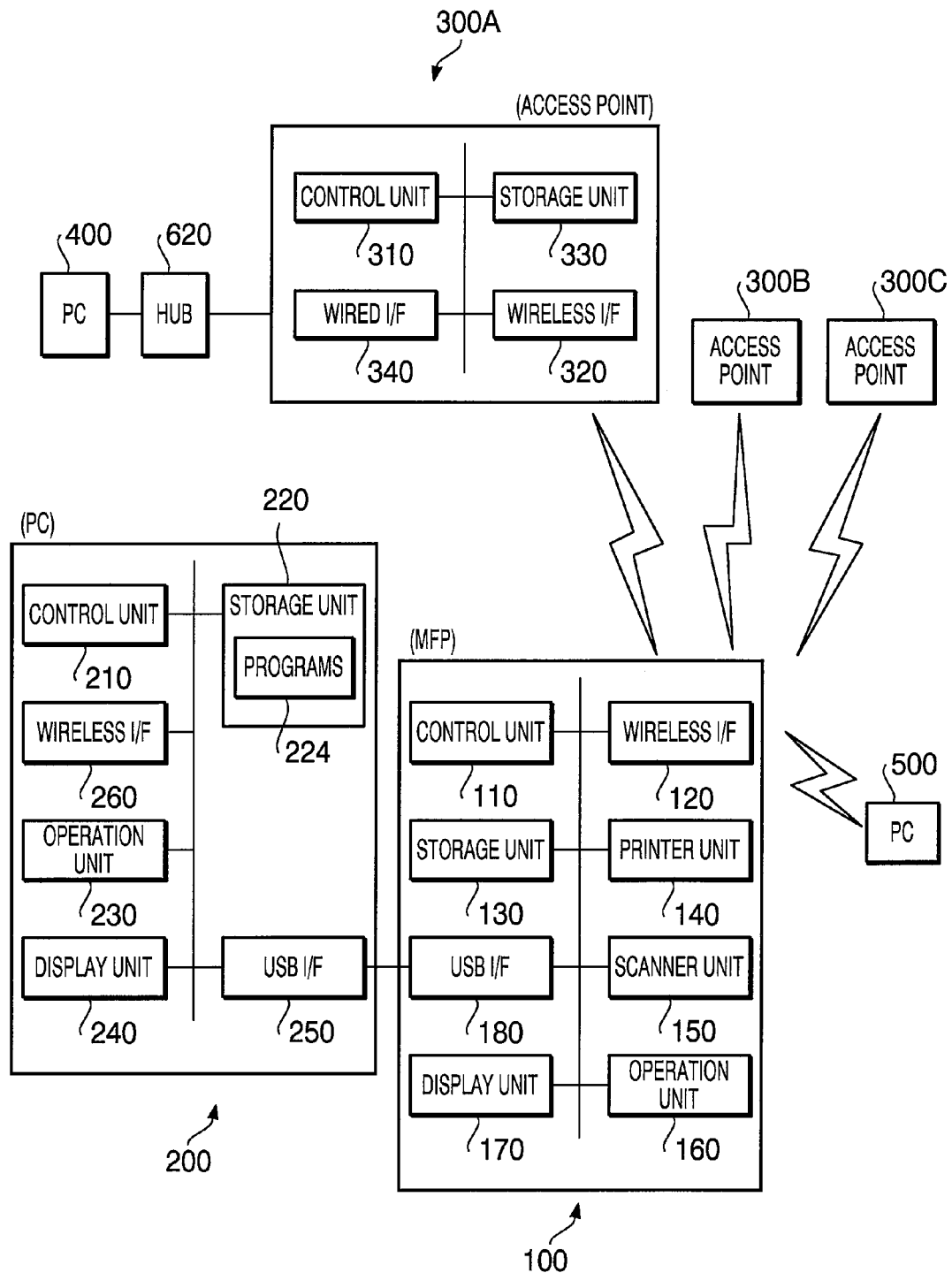
FIG. 2 is a block diagram to illustrate the network system 10 with device components according to the first embodiment of the present invention.

The MFP 100 is further connected with a PC 200 through an USB (universal serial bus) interface (I/F) 180 (see FIG. 2). The PC 200 can process the wireless settings which are to be installed in the MFP 100. The connection between the MFP 100 and the PC 200 is not limited to the USB interfaces 180, 250 (see FIG. 2), but may be achieved through, for example, a wired LAN cable. When the PC 200 is equipped with a wireless interface, for another example, the connection may be achieved through ad-hoc wireless communication.

Figure 1:
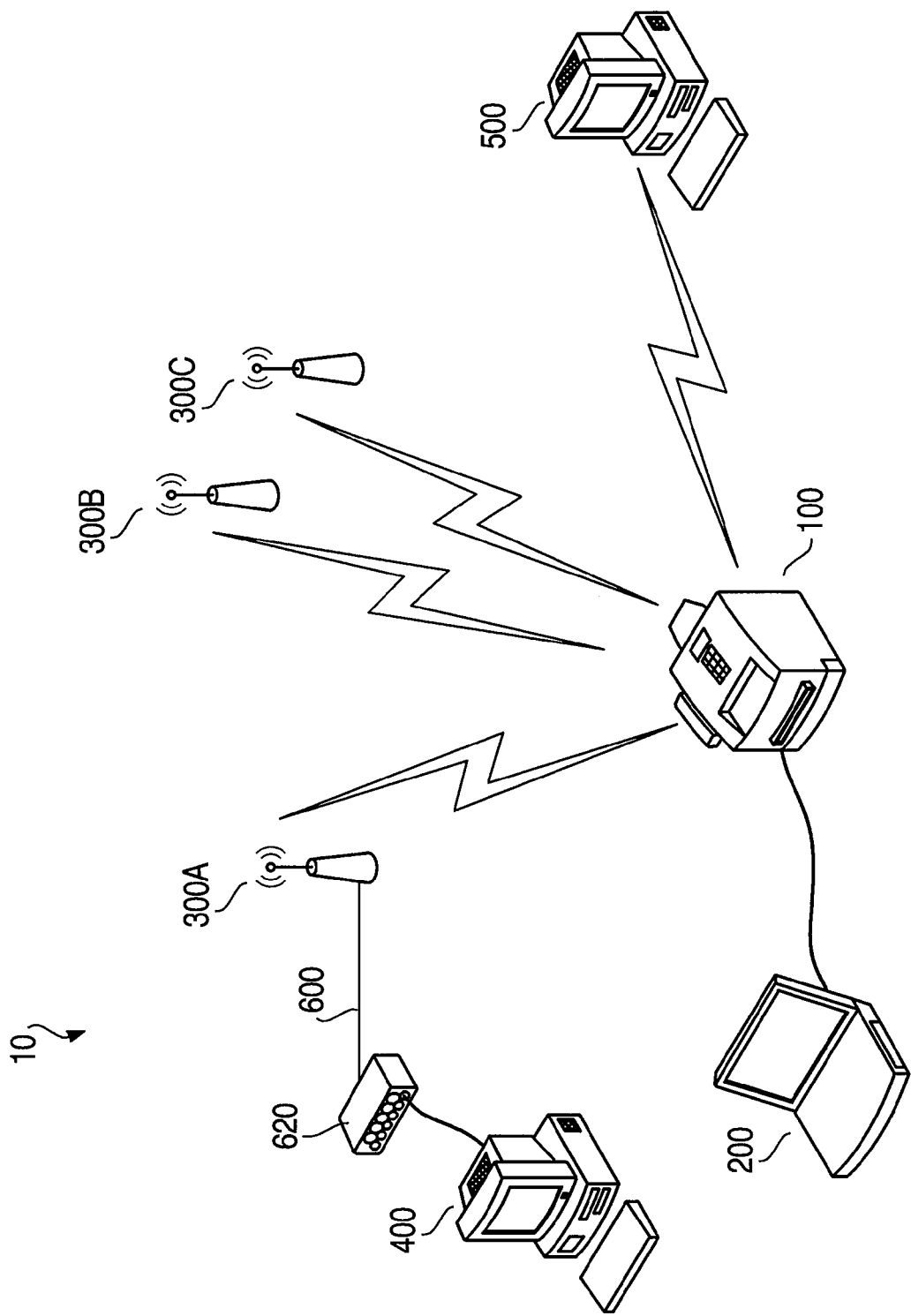
FIG. 1 is a schematic diagram to illustrate a network system 10 according to a first embodiment of the present invention.

The wireless network 10 further has a plurality of access points, including access points 300B and 300C in addition to the access point 300A. Furthermore, a PC 500 having a wireless interface is wirelessly connected with the wireless network 10. In the following description, a communication mode for wireless connection achieved through the access points 300A, 300B, and 300C will be referred to as infrastructure mode. On the other hand, a communication mode for wireless connection achieved by two devices, which communicate with each other directly, will be referred to as ad-hoc mode. In FIG. 1, for example, when the PC 500 and the MFP 100 communicate directly with each other, and when print data transmitted from the PC 500 is received by the MFP 100, the communication mode for the data transmission is ad-hoc mode.

Referring to FIG. 2, the device components in the network system 10 according to the present embodiment will be described. According to the present embodiment, the access points 300B, 300C are configured to have same functionalities as the access point 300A and therefore serve similarly to the access point 300A in the network system. Therefore, detailed description and illustration of the access points 300B, 300C are represented by those of the access point 300A. The PCs 400 and 500 are configured substantially similarly to the PC 200; therefore, description and illustration of the PCs 400 and 500 are represented by those of the PC 200.

The configuration of the MFP 100 will be described. The MFP 100 includes a control unit 110, a wireless interface (I/F) 120, a storage unit 130, a printer unit 140, a scanner unit 150, an operation unit 160, a display unit 170, and a USB interface 180. The control unit 110 controls behaviors of the MFP 100 itself. The control unit 110 includes, for example, a CPU being an arithmetic processor, a ROM to store various programs to manipulate the MFP 100, and a RAM being a workspace for the processor. When the CPU runs a program stored in the ROM, operations to manipulate the MFP 100 are performed. In this regard, various data, for example, data exchanged with an external device through the wireless interface 120 and entered through the operation unit 160, is stored in the RAM. The stored data is processed by the CPU which accesses the RAM. The CPU develops the programs stored in the ROM in the RAM to run so that the MFP 100 is controlled to provide its functions to the user.

The wireless interface 120 in the MFP 100 is an interface to connect the MFP 100 to, for example, the access point 300A wirelessly in the infrastructure mode and to the PC 500 wirelessly in the ad-hoc mode. The storage unit 130 is a data storage to store information concerning wireless communication settings of the MFP 100 and may be a non-volatile storage (e.g., an EEPROM) and a hard disk. The printer unit 140 prints an image according to image data, for example, transmitted from the PC 400 or entered through the scanner unit 150. The scanner unit 150 scans an image formed on an original document which is placed on a document holder (not shown). The operation unit 160 provides an interface for data input to a user and includes, for example, input keys such as direction keys, numerical keys, an enter key, and a cancel key. The display unit 170 displays various information concerning operations in the MFP 100. The USB interface (I/F) 180 provides an interface to other USB-enabled devices to be connected with the MFP 100.

The MFP 100 according to the present embodiment is configured to support a plurality of authorization methods, which are open authorization, shared-key authorization, WPA-PSK, and WPA2-PSK, and a plurality of encryption methods, which are WEP, TKIP, and AES. The MFP 100 is also capable of communicating with an external device without encryption.

Table 1 provided below indicates correspondence of the available authorization method with the encryption methods, allowable lengths of passwords, and supporting wireless communication modes.

TABLE 1

| Authorization Method | Encryption Method | | Length of Password (available character count) | Communication Mode |
|---|---|---|---|---|
| WPA2-PSK | AES | TKIP | 8 ≦ character count ≦ 63 | infrastructure |
| WPA-PSK | AES | TKIP | 8 ≦ character count ≦ 63 | infrastructure |
| Shared-Key | | WEP | 5/10/13/26 | infrastructure |
| Open | WEP | none | open/WEP: 5/10/13/26 open/none: 0 | infrastructure/ ad-hoc |

In Table 1, a lowermost line indicates available encryption methods, allowable lengths of password, and supporting communication modes in open authorization method and when the communication is provided without authorization. Indication "none" in the right half section in the encryption column of the lowermost line refers to that no encryption is required or that encryption is invalidated. In the third line, the allowable length of a password for Shared-key authorization and WEP encryption may be, in addition to 5, 10, 13, and 26 as indicated in Table 1, 16 or 32. However, description for those cases, in which passwords including 16 or 32 characters are used, will be omitted. The infrastructure mode can be employed in any of the authorization methods listed in Table 1, whilst the ad-hoc mode can be employed in the case when no authorization method is required. In the following description, the authorization methods "WPA-PSK" and "WPA2-PSK" will be also referred to as "WPA" and "WPA2" respectively.

The configuration of the PC 200 will be described. The PC 200 is a known personal computer and includes a control unit 210, a storage unit 220, an operation unit 230, a display unit 240, a USB interface 250, and a wireless interface (I/F) 260. The control unit 210 includes, for example, a CPU, a ROM, and a RAM and controls behaviors of the PC 200 itself. The storage unit 220 is a data storage to store programs 224 which are run to install the wireless settings of the PC 200. The storage unit 220 may be, for example, a hard disk. The CPU in the control unit 210 processes data, which is entered through the USB interface 250 and the operation unit 230, stored in the ROM, and develops the programs 224 stored in the storage unit 220 in the RAM to run, the PC 200 is controlled to provide its functions to the user.

The operation unit 230 provides an input interface to the user entering instructions for running the programs 224 to the PC 200. The operation unit 230 includes, for example, a keyboard and a mouse. The display unit 240 displays information concerning operations performed in the PC 200. The USB interface 250 provides an interface to connect the PC 200 to USB-enabled external devices. Further, The PC 200 includes the wireless interface 260, which provides an interface to connect the PC 200 with external devices wirelessly in the infrastructure mode or in ad-hoc mode.

The configuration of the access point 300A will be described. The access point 300A is a known access point and includes a control unit 310, a wireless interface (I/F) 320, a storage unit 330, and a wired interface (I/F) 340. The control unit 310 includes a CPU, a ROM, and a RAM and controls behaviors of the access point 300A. The wireless interface 320 provides an interface to external devices to be wirelessly connected with the access point 300A. Data to be exchanged with the external devices is transmitted and received through the wireless interface 320. The storage unit 330 is a data storage to store information concerning wireless communication settings of the access point 300A. The information to be stored includes an SSID (Service Set Identifier) being an identifier to identify the wireless network, a valid authentication method, an encryption method, and a password for the network. The storage unit 330 may be, for example, an EEPROM. The wired interface 340 is an interface to connect the access point 300A with wired LAN 600.

Hereinafter, three embodiments of processes concerning installation of the wireless settings in the MFP 100 will be described. Wireless connection between the access point 300A and the MFP 100 is established when any of these processes completes. Thereafter, the MFP 100 is allowed to communicate with the PC 400 to receive, for example, print data transmitted from the PC 400 to print and transmit image data scanned by the scanner unit 150 of the MFP 100 to the PC 400.

Figure 3:
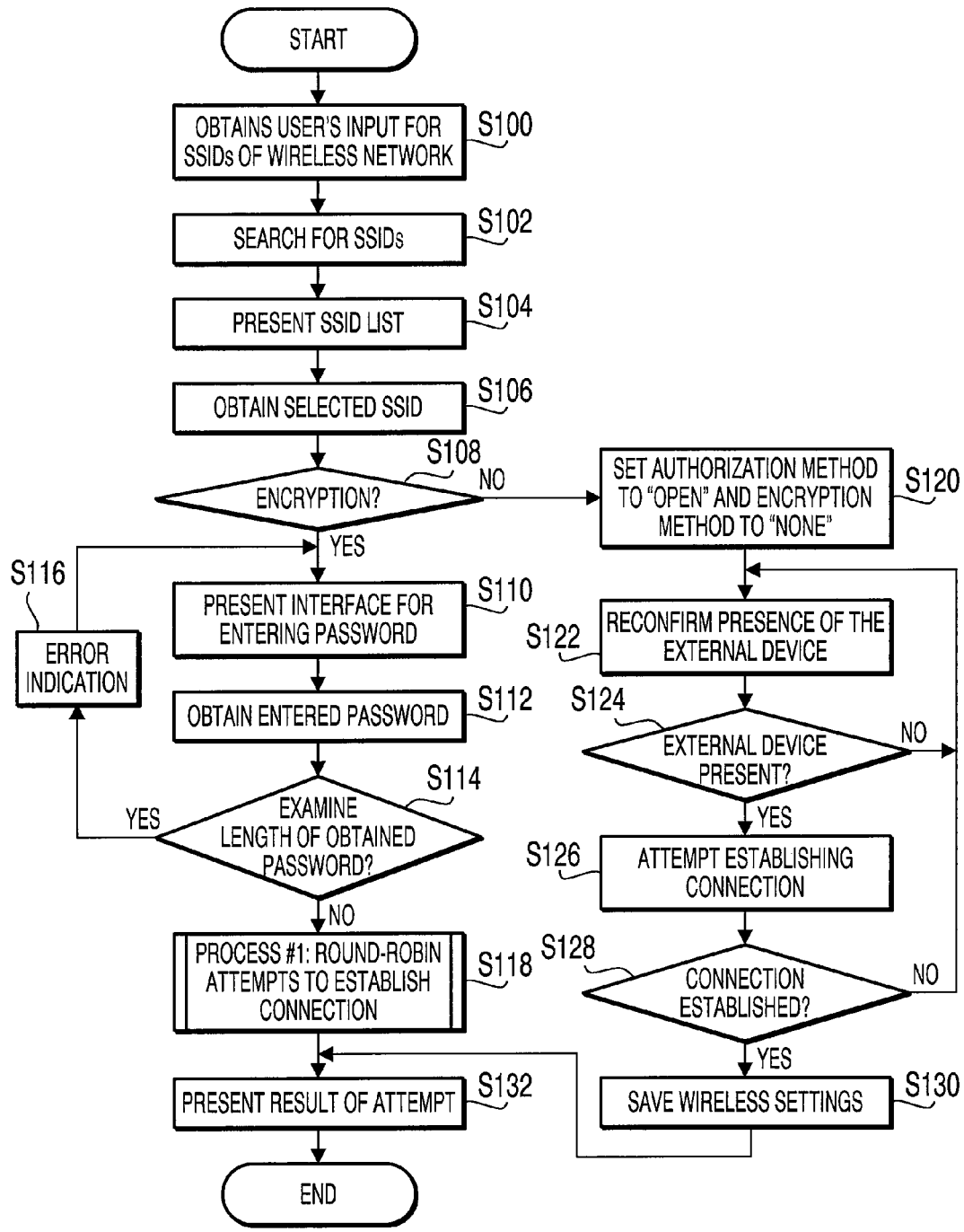
FIG. 3 is a flowchart to illustrate a wireless settings installation process according to the first embodiment of the present invention.

A first embodiment of a wireless settings installation process to be executed in the MFP 100 will be described with reference to FIG. 3. When a user enters an instruction to start the process through the operation unit 160, the control unit 110 detects the instruction and starts the process. In particular, when the user enters the instruction in the MFP 100 through the operation unit 160 to search for wireless networks, in S100, the control unit 110 obtains the instruction. Thereafter, in S102, the control unit 110 manipulates the wireless interface 120 to search for external devices (e.g., the access points 300A-300C and the PC 500) which are provided in the vicinity of the MFP 100 within the wireless networks. In particular, in S102, the control unit 110 receives SSIDs which are provided from the external devices. During the search, the control unit displays status (see FIG. 4A) indicating that the MFP 100 is in progress to detect the wireless networks in the display unit 170 of the MFP 100. When the control unit 110 collects the SSIDs received through the wireless interface 120, in S104, the control unit 110 presents a list including the collected SSIDs to the user through the display unit 170 (see FIG. 4B). The user is prompted to select one of the SSIDs of a wireless network, to which the MFP 100 should be connected. The control unit 110 waits until the user selects one of the SSIDs. In this regard, the user may directly enter an SSID to which the MFP 100 should be connected.

When the user's selection is entered through the operation unit 160, in S106, the control unit 110 obtains the selected SSID. Thereafter, in S108, the control unit 110 examines as to whether the wireless network represented by the selected SSID employs an encryption method. The SSIDs respectively includes appended information to indicate employment of an encryption method in the wireless network to which the external device belongs. The control unit 110 refers to the appended information and determines employment of an encryption method based on the appended information. When the control unit 110 determines that the wireless network represented by the selected SSID employs an encryption method (S108: YES), in S110, the control unit 110 displays a user interface (see FIG. 4C) to prompt the user to enter a password in the display unit 170. The password is a predetermined character string for communication devices to be connected with the wireless network. In the present embodiment, as shown in FIG. 4C, the password is "ABCDEFG."

When the user enters the password through the operation unit 160, in S112, the control unit 110 obtains the entered password. Thereafter, in S114, the control unit 110 examines a length (i.e., a count of characters) of the obtained password. More specifically, it is examined as to whether the count of characters in the obtained password is any of 0-4, 6, 7, 64 or greater than 64. These counts are incorrect numbers of characters for the password (see Table 1) according to any of the encryption methods supported by the MFP 10. If the count of characters included in the obtained password is any of 0-4, 6, 7, 64 and more than 64, i.e., when the count of characters is not any of 5 or 8-63 (S114: YES), the control unit 110 determines that the entered password is incorrect. Therefore, in S116, the control unit 110 presents a message indicating that the password is incorrect to the user through the display unit 170 and returns to S110. Thus, the user is again prompted to enter a password.

The flow S110-S116 may be repeated endlessly. Alternatively, the flow may be terminated when the flow S110-S116 is repeated for a predetermined number times (e.g., 3 times), i.e., when the user enters incorrect passwords for the predetermined number of times, in order to avoid that the user, not knowing the correct password, enters the correct password by chance. Thus, security of the wireless network can be maintained.

In S114, when the count of characters included in the obtained password is not any of 0-4, 6, 7, 64 and more than 64 but one of 5 and 8-63 (S114: NO), in S118, the control unit 110 attempts to establish connection with an external device included in the wireless network, which is represented by the selected SSID, according to the authorization methods and the encryption methods supported in the MFP 100. A detailed behavior of the control unit 110 in S118 to establish connection will be described later. Result of the attempts is presented to the user through the display unit 170 in S132.

In S108, when the control unit 110 determines that the wireless network represented by the selected SSID does not employ an encryption method (S108: NO), in S120, the control unit 110 adopts the set of the authorization method being "open" and the encryption method being "none." The adopted set indicating the wireless settings, in which the MFP 100 attempts to establish connection with the selected wireless network, is stored in a predetermined area in the storage unit 130. The flow proceeds to S122. In S122, the control unit 110 examines as to whether the external device provided the SSID selected in S106 remains in the wireless network. In other words, it is reconfirmed that the external device which provided the SSID remains active in the wireless network. The reconfirmation is performed in consideration of cases where, for example, the external device may have been switched off. In S122, specifically, the control unit 110 manipulates the wireless interface 120 to transmit predetermined data to the external device and receives data which is transmitted from the external device in reply. Alternatively, the control unit 110 receives data issued and transmitted from the external device periodically. In either case, when the control unit 110 receives predetermined data from the external device, it is determined that the external device remains active in the wireless network (S124: YES). When the control unit 110 does not receive the predetermined data from the external device, it is determined that the external device no longer exists in the wireless network (S124: NO).

When receipt of the data from the external device is detected (S124: YES), in S126, the control unit 110 attempts to establish connection with the external device according to the authorization method (i.e., open) and the encryption method (i.e., none) saved in the storage unit 130 in S120 and the SSID obtained in S106. In S128, it is examined as to whether the connection is established. When the connection is established (S128: YES), in S130, the control unit 110 saves the wireless settings of the communication with the external device, which are the authorization and encryption methods and the SSID obtained in S106, in the storage unit 130 to be the wireless settings for regular use. The flow proceeds to S132. In S132, the control unit 110 presents a message indicating the successful establishment of the connection with the external device to the user through the display unit 170. The flow ends thereafter.

In S124, when the control unit 110 does not receive the predetermined data from the external device (S124: NO), the control unit 110 returns to S122 and waits until presence of the external device is detected.

In S128, when attempts to establish connection with the external device fails (S128: NO), the control unit 110 returns to S122 and repeats S122. In S124, if presence of the external device is not detected (S124: NO) or in S128, if the attempt to establish connection with the external device fails (S128: NO), the flow repeats S122 and the succeeding steps. When, again, in S124, if presence of the external device is not detected (S124: NO) or in S128, if the attempt to establish connection with the external device fails (S128: NO), in S132, the control unit 110 presents a message indicating the failure of connection establishment to the user through the display unit 170. Meanwhile, the control unit 110 repeats S122 and the succeeding steps in the background operation. When presence of the external device is detected (S124: YES), and connection with the external device is established (S128: YES), the control unit 110 proceeds to S130 and thereafter to S132.

In S122-S128, when the attempts to establish connection with the external device fail successively for a predetermined number of times, the flow may be terminated rather than repeating S122-S128 endlessly.

Additionally or alternatively, presentation of the message indicating the attempted result of the connection establishment through the display unit 170 in S132 may be replaced with presenting the message on a sheet of paper by manipulating the printer unit 140 (i.e., printing the message on the recording sheet to present to the user).

Figure 5:
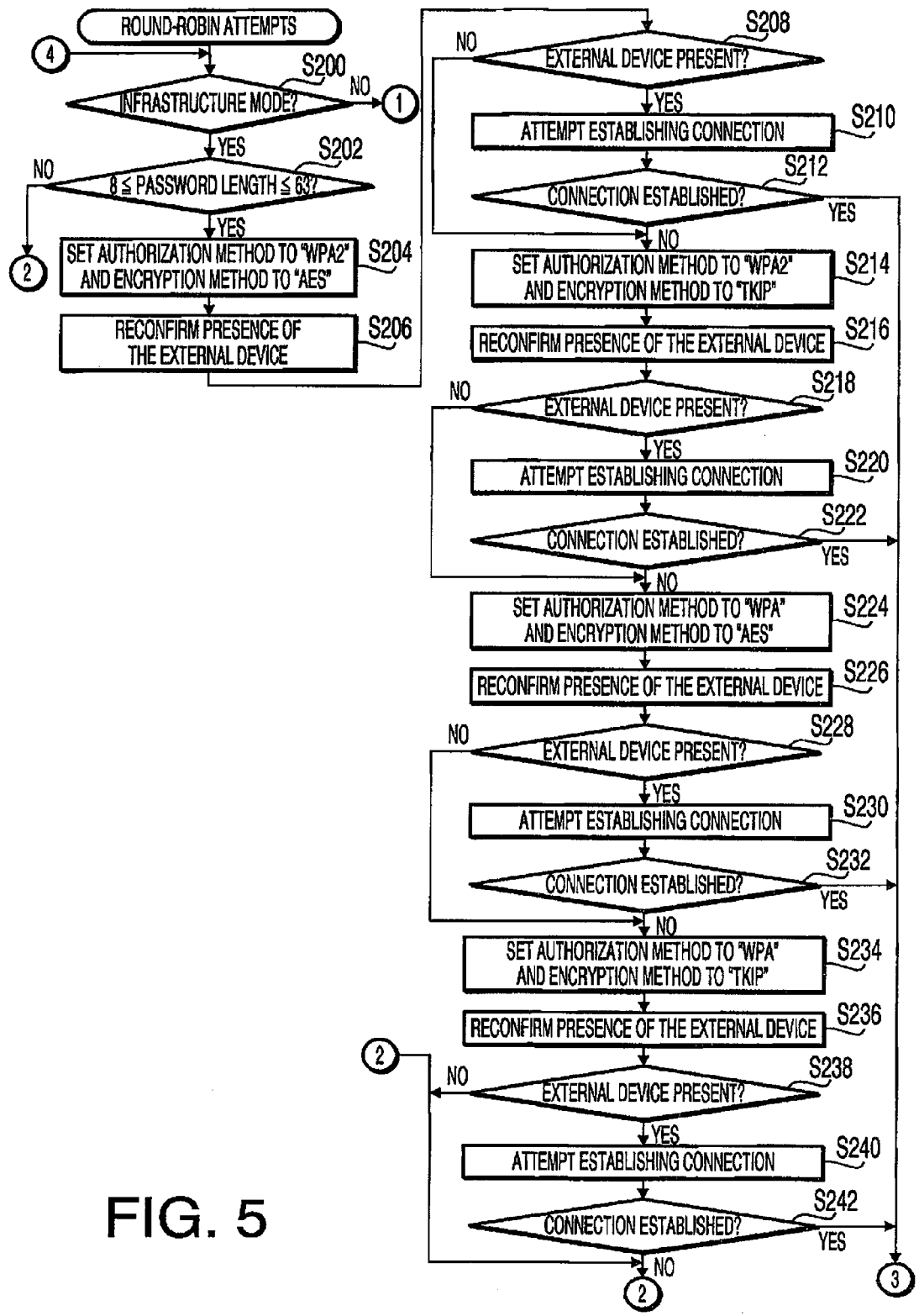
FIG. 5 is a flowchart to illustrate a detailed flow of round-robin attempts to establish connection between an MFP (multifunction peripheral) 100 and an external device within the network system 10 according to the first embodiment of the present invention.
Figure 6:
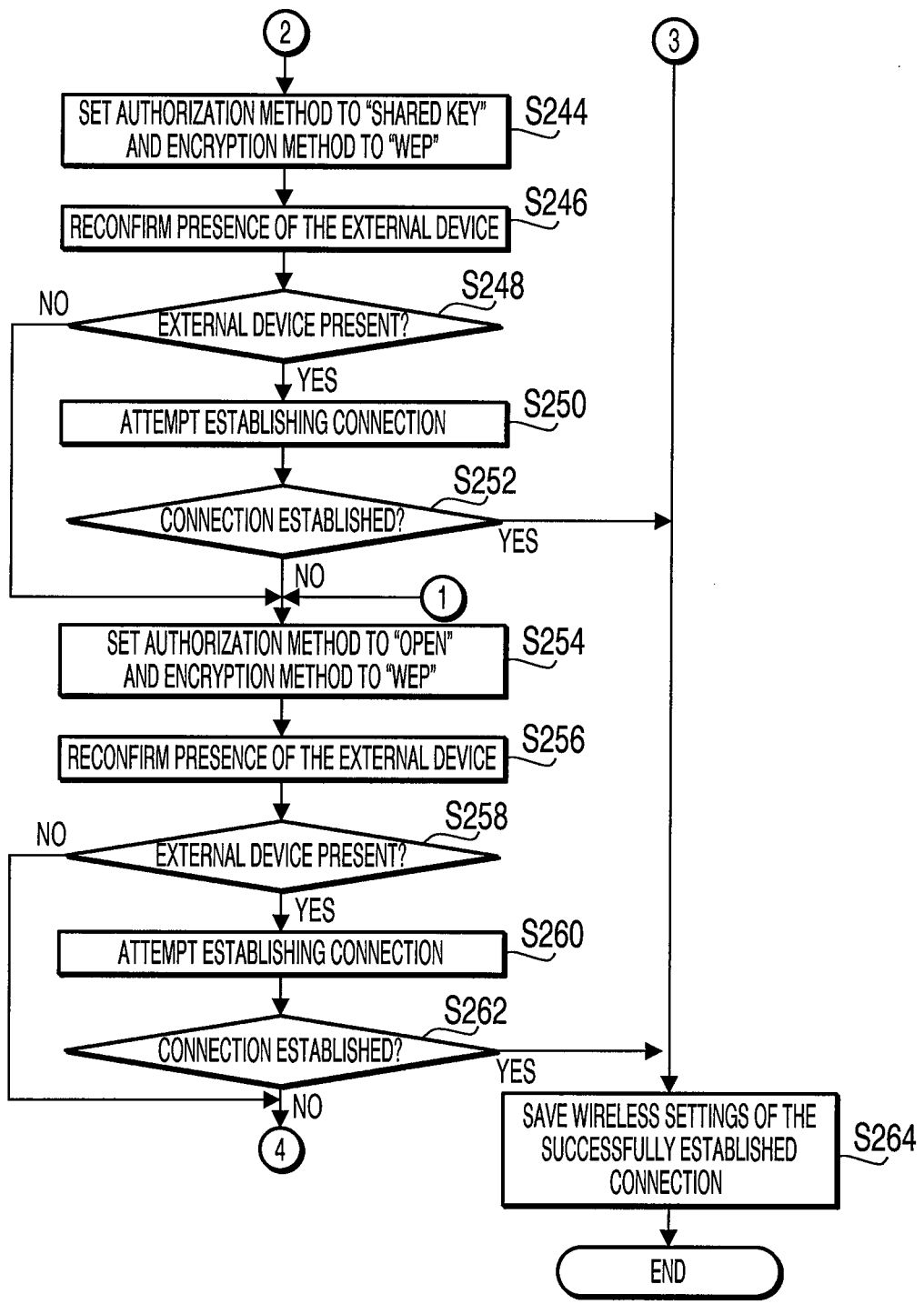
FIG. 6 is a flowchart to illustrate the detailed flow of round-robin attempts to establish connection between the MFP 100 and the external device within the network system 10 according to the first embodiment of the present invention.

Next, a detailed flow of behaviors of the control unit 110 of the MFP 100 in S118 mentioned above will be described with reference to FIGS. 5 and 6. In this flow, the control unit 110 attempts to establish connection with the external device in the wireless network, which is identified by the selected SSID, according to the authorization methods and the encryption methods supported in the MFP 100. Specifically, the control unit 110 attempts to establish connection with the external device in each set of the authorization method and the encryption method, which are indicated in Table 1. The flow in S118 will be also referred to as Process #1.

When the flow in Process #1 starts, in S200, the control unit 110 examines as to whether the wireless network represented by the SSID, which was obtained in S106, operates in the infrastructure mode. In this step, the control unit 110 specifically examines information appended to the SSID, which was obtained from the external device in S102 through the wireless interface 120. The appended information indicates the communication mode of the wireless network, which is one of the infrastructure mode and the ad-hoc mode. When the control unit 110 determines that the communication mode is the ad-hoc mode (S200: NO), the flow proceeds to S254 (see FIG. 6). When the communication mode is the infrastructure mode (S200: YES), the flow proceeds to S202. In S202, the control unit 110 examines as to whether the character count of the password, which was obtained in S112, is greater than or equal to 8, or smaller than or equal to 63. For example, when the password includes 5 characters (S202: NO), sets of "WPA2 and AES," "WPA2 and TKIP," "WPA and AES" and "WPA and TKIP" are omitted from the wireless settings in which the control unit 110 should attempt to establish connection. In other words, when 5 characters are included in the password, the flow proceeds to S244 (FIG. 6), and the control unit attempts to establish connection with the external device in the wireless settings of sets: "Shared-key and WEP" and "open and WEP."

In S202, if the control unit 110 determines that the character count of the password is greater than or equal to 8, or smaller than or equal to 63 (S202: YES), in S204, the control unit 110 adopts the set "WPA2 and AES" for the authorization method and the encryption method and reserves the set in the storage unit 130 to be the wireless settings, in which the control unit 110 will attempt to establish connection with the external device. In S206, the control unit 110 examines as to whether the external device provided the SSID selected in S106 remains in the wireless network. The reconfirmation of presence of the external device is performed in the same reason for S122 in FIG. 3. Therefore, the method to detect presence of the external device is the same with that used in S122. Further, reconfirmation in S216, S226, S236, S246, and S256, which will be described later, is performed similarly. In S208, if the external device is not detected (S208: NO), the flow proceeds to S214. If the external device is detected (S208: YES), in S210, the control unit 110 attempts to establish connection with the external device according to wireless settings, which are the authorization method (i.e., WPA2) and the encryption method (i.e., AES), the SSID obtained in S106, and the password obtained in S112.

In S212, it is examined as to whether the connection is established. When the attempt to establish connection fails (S212: NO), in S214, the control unit 110 adopts the next set of the authorization method and the encryption method: "WPA2 and TKIP" and replaces the set "WPA2 and AES" saved in the storage unit in S204 with "WPA2 and TKIP." Thereafter, in S216, the control unit 110 examines as to whether the external device provided the SSID selected in S106 remains in the wireless network. In S218, if the external device is not detected (S218: NO), the flow proceeds to S224. If the external device is detected (S218: YES), in S220, the control unit 110 attempts to establish connection with the external device according to wireless settings, which are the authorization method (i.e., WPA2) and the encryption method (i.e., TKIP), the SSID obtained in S106, and the password obtained in S112.

In S222, it is examined as to whether the connection is established. When the attempt to establish connection fails (S222: NO), in S224, the control unit 110 adopts the next set of the authorization method and the encryption method: "WPA and AES" and replaces the set "WPA2 and TKIP" saved in the storage unit in S214 with "WPA and AES." Thereafter, in S226, the control unit 110 examines as to whether the external device provided the SSID selected in S106 remains in the wireless network. In S228, if the external device is not detected (S228: NO), the flow proceeds to S234. If the external device is detected (S228: YES), in S230, the control unit 110 attempts to establish connection with the external device according to wireless settings, which are the authorization method (i.e., WPA) and the encryption method (i.e., AES), the SSID obtained in S106, and the password obtained in S112.

In S232, it is examined as to whether the connection is established. When the attempt to establish connection fails (S232: NO), in S234, the control unit 110 adopts the next set of the authorization method and the encryption method: "WPA and TKIP" and replaces the set "WPA and AES" saved in the storage unit 130 in S224 with "WPA and TKIP." Thereafter, in S236, the control unit 110 examines as to whether the external device provided the SSID selected in S106 remains in the wireless network. In S238, if the external device is not detected (S238: NO), the flow proceeds to S244. If the external device is detected (S238: YES), in S240, the control unit 110 attempts to establish connection with the external device according to wireless settings, which are the authorization method (i.e., WPA) and the encryption method (i.e., TKIP), the SSID obtained in S106, and the password obtained in S112. In S242, it is examined as to whether the connection is established. When the attempt to establish connection fails (S242: NO), the flow proceeds to S244 (see FIG. 6).

In the above flow, if connection is established in any of S212 (S212: YES), S222 (S222: YES), S232 (S232: YES), and S242 (S242: YES), the flow proceeds to S264 (see FIG. 6).

In S244, the control unit 110 adopts the next set of the authorization method and the encryption method: "Shared-key and WEP" and replaces the set "WPA and TKIP" saved in the storage unit in S234 with "Shared-key and WEP." Thereafter, in S246, the control unit 110 examines as to whether the external device provided the SSID selected in S106 remains in the wireless network. In S248, if the external device is not detected (S248: NO), the flow proceeds to S254. If the external device is detected (S248: YES), in S250, the control unit 110 attempts to establish connection with the external device according to wireless settings, which are the authorization method (i.e., Shared-key) and the encryption method (i.e., WEP), the SSID obtained in S106, and the password obtained in S112.

In S252, it is examined as to whether the connection is established. When the attempt to establish connection fails (S252: NO), in S254, the control unit 110 adopts the next set of the authorization method and the encryption method: "open and WEP" and replaces the set "Shared-key and WEP" reserved in the storage unit in S244 with "open and WEP." Thereafter, in S256, the control unit 110 examines as to whether the external device provided the SSID selected in S106 remains in the wireless network. In S258, if the external device is not detected (S258: NO), the flow returns to S200. Thereafter, the control unit 110 repeats S110 and the succeeding steps in the background operation. If the external device is detected (S258: YES), in S260, the control unit 110 attempts to establish connection with the external device according to wireless settings, which are the authorization method (i.e., open) and the encryption method (i.e., WEP), the SSID obtained in S106, and the password obtained in S112.

In S262, it is examined as to whether the connection is established. When the attempt to establish connection fails (S262: NO), the flow returns to S200 and repeats S200 and the succeeding steps in the background operation. If connection is established in either of S252 (S252: YES) and S262 (S262: YES), the flow proceeds to S264. In S264, the control unit 110 saves the wireless settings, i.e., the set of the authorization method and the encryption method, the SSID, and the password, by which the control unit 100 successfully established connection with the external device, in the storage unit 130. The flow in S118 ends thereafter. In S264, the communication mode for the wireless network (i.e., as to whether the infrastructure mode or the ad-hoc mode) is also saved in the storage unit 130.

If the external device is not detected in S258 (S258: NO), or if the attempt to establish connection fails (S262: NO), the control unit 110 repeats S200 and the succeeding steps in the background operation. Meanwhile, in S132, the control unit 110 presents a message indicating the failure of the attempts to the user through the display unit 170. When presence of the external device is detected (e.g., S208: YES) during the background operation, and connection with the external device is established (e.g., S212: YES), the control unit 110 proceeds to S130 and thereafter to S264 and to S132. In S200-S262, when the attempts to establish connection with the external device fail successively for a predetermined number of times, the flow may be terminated rather than repeating S200-S262 endlessly.

According to the above flows, the control unit 110 of the MFP 100 can attempt to establish connection with the external device in the wireless network, which is selected by the user, based on different sets of wireless settings (i.e., the authorization methods and the encryption methods supported in the MFP 100 itself), the SSID representing the wireless network, and the password entered by the user. Specifically, the different sets of the authorization method and the encryption method are attempted successively in turn so that the wireless settings in which the control unit 110 successfully established connection with the external devices are saved in the storage unit 130 (see S264). Therefore, the MFP 100 can be connected in the wireless network whilst the user is not required to specify the correct set of the authorization method and the encryption method employed in the wireless network.

When the control unit 110 fails to establish connection with the external device in S118, Process #1 in S118 is repeated in the background operation so that establishment of connection with the external device can be retried. Thus, the connection may be established in the second or later attempt. Therefore, even when establishment of connection fails in the first attempt due to an accidental cause, the cause may be resolved whilst the attempts are repeated, and the connection may be established in the second or later attempt.

Figure 7:
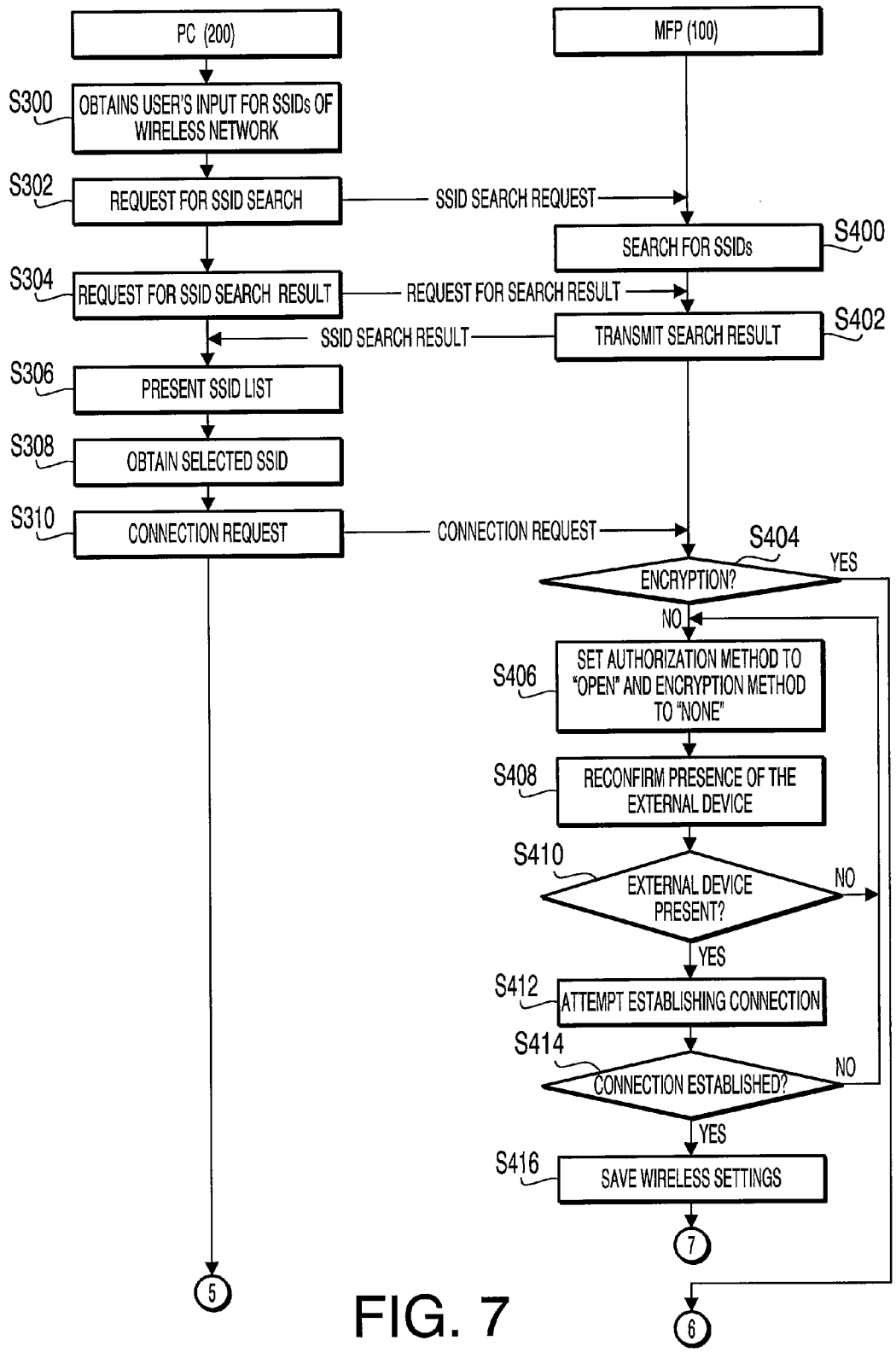
FIG. 7 is a flowchart to illustrate the wireless settings installation process according to a second embodiment of the present invention.
Figure 8:
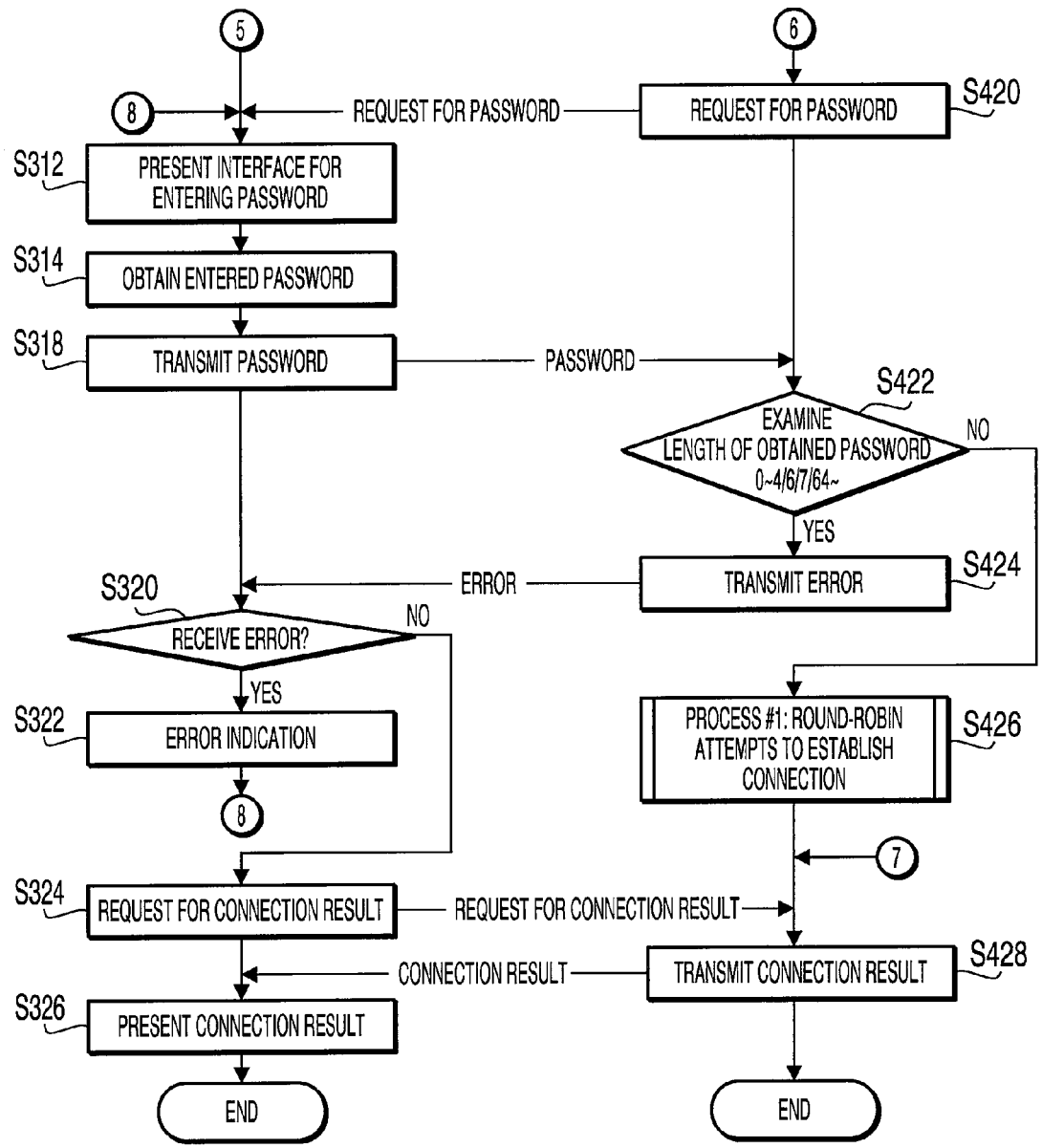
FIG. 8 is a flowchart to illustrate the wireless settings installation process according to the second embodiment of the present invention.

Next, a second embodiment of the wireless settings installation process to be executed in the MFP 100 and the PC 200 will be described with reference to FIGS. 7 and 8. The second embodiment of the wireless settings installation process is carried out in cooperation of the MFP 100 and the PC 200 which is connected to the MFP 100 via the USB interfaces 180, 250. In particular, the MFP 100 installs the wireless settings in the MFP 100 itself according to instructions provided by the PC 200.

When the user enters an instruction to start the process through the operation unit 230 of the PC 200, the control unit 210 of the PC 200 detects the instruction and activates a program 224 stored in the storage unit 220. Further, the control unit 210 presents predetermined information to the user through the display unit 240. When the user enters an instruction in the PC 200 through the operation unit 230 to search for wireless networks, in S300, the control unit 210 obtains the instruction. Thereafter, in S302, the control unit 210 manipulates the USB interface 250 to transmit a request to search for SSIDs representing available wireless networks to the MFP 100. After transmitting the search request, and until a searched result is received in the PC 200, the control unit 210 displays status (see FIG. 4A) indicating that the search is in progress in the display unit 240 of the PC 200.

Meanwhile, the control unit 110 of the MFP 100 manipulates the USB interface 180 to receive the search request for SSIDs transmitted from the PC 200. Thereafter, in S400, the control unit 110 controls the wireless interface 120 and searches for available external devices (i.e., the access points 300A-300C and the PC 500). The external devices are detected when the SSIDs output from the external devices are received through the wireless interface 120. The control unit 110 obtains the collected SSIDs and creates a search result according to the SSIDs. In this regard, the control unit 110 receives information, indicating as to whether the wireless network represented by the SSID employs any encryption method, appended to the SSID. The control unit 110 reserves the appended information in, for example, a RAM (not shown) to be associated with the respective SSID.

The control unit 210 of the PC 200 waits for the SSID search result to be transmitted from the MFP 100; therefore, in S304, the control unit 210 transmits a request for the SSID search result to the MFP 100. In S402, the control unit 110 of the MFP 100 receiving the request for SSID search result controls the USB interface 180 to transmit the collected search result along with the appended information concerning the encryption of the wireless network to the PC 200.

The control unit 210 of the PC 200 controls the USB interface 250 to receive the search result with the appended information. Further, in S306, the control unit 210 presents a list including the collected SSIDs to the user through the display unit 240 (see FIG. 4B). The user is prompted to select one of the SSIDs of a wireless network, to which the MFP 100 should be connected. The control unit 210 waits until the user selects one of the SSIDs. In this regard, the user may directly enter an SSID to which the MFP 100 should be connected.

When the user's selection is entered through the operation unit 230, in S308, the control unit 210 obtains the selected SSID. Thereafter, in S310, the control unit 210 manipulates the USB interface 250 to transmit a connection request to the MFP 100. The connection request is a request to the MFP 100 to attempt establishing connection with the wireless network represented by the SSID, which was obtained in S308, and includes the SSID. The control unit 110 of the MFP 100 manipulates the USB interface 180 and receives the connection request. Further, in S404, the control unit 110 refers to the information reserved in the RAM in association with the SSIDs obtained in the SSID search result to determine as to whether the wireless network represented by the SSID included in the connection request employs any encryption method. If it is determined that no encryption method is employed (S404: NO), the control unit 110 performs steps S406-S416 and proceeds to S428 (see FIG. 8). The steps S406-416 are identical with the steps S120-S130 in the wireless settings installation process according to the first embodiment and shown in FIG. 3; therefore, description of those is omitted.

In S404, if it is determined that an encryption method is employed in the wireless network (S404: YES), the flow proceeds to S420 (see FIG. 8). In S420, the control unit 110 manipulates the USB interface 180 to transmit a request for a password to the PC 200. The control unit 210 of the PC 200 manipulates the USB interface 250 to receive the password request and performs steps S312 and S314. The steps S312 and S314 are identical with the steps S110 and S112 in the wireless settings installation process according to the first embodiment and shown in FIG. 3; therefore, description of those is omitted. In S318, the control unit 110 manipulates the USB interface 250 to transmit the password obtained in S314 to the MFP 100.

The control unit 110 of the MFP 100 receiving the password through the USB interface 180, in S422, examines a length of the received password. The examination of the length of the password in S422 is identical to the examination in S114 in the wireless settings installation process according to the first embodiment; therefore description of that is omitted. If the count of characters included in the password is any of 0-4, 6, 7, 64 and more than 64, (S422: YES), the control unit 110 determines that the entered password is incorrect. Therefore, in S424, the control unit 110 transmits error indication to the PC 200. If the count of characters included in the password is not any of 0-4, 6, 7, 64 and more than 64 but one of 5 and 8-63 (S422: NO), in S426, the control unit 110 attempts to establish connection with an external device included in the wireless network, which is represented by the selected SSID, according the authorization methods and the encryption methods supported in the MFP 100 in the round-robin attempts. The round-robin attempts to establish connection with the external device in S426 is identical to Process #1 in S118 in the wireless settings installation process according to the first embodiment and shown in FIG. 3 and FIGS. 5-6; therefore, description of S426 is omitted.

Meanwhile, the control unit 210 of the PC 200 determines in S320 as to whether the password transmitted to the MFP 100 in S316 is incorrect. In particular, it is examined as to whether the error indication issued from the MFP 100 in S424 is received. When the error indication is received (S320: YES), in S322, the control unit 210 presents a message indicating that the password is incorrect to the user through the display unit 240 and returns to S312. Thus, the user is again prompted to enter a password.

In S320, if no error indication is received within a predetermined period (S320: NO), the flow proceeds to S324. After a predetermined length of period from transmission of the connection request in S310 or transmission of the password in S318, in S324, the control unit 210 transmits a request for result of attempts to establish connection with the external device to the MFP 100. The control unit 110 of the MFP 100 manipulates the USB interface 180 to receive the request for result of attempts. Further, in S428, the control unit 110 transmits result of the attempts in S426 to the PC 200. The control unit 210 of the PC 200 receives the result of the attempts and in S326 presents the result to the user through the display unit 240. The flow ends thereafter.

In the above flow, the connection request transmitted from the PC 200 in S310 to the MFP 100 includes the SSID representing the wireless network to which the MFP 100 should be connected. However, the SSID may not necessarily be included in the connection request. For example, when the SSIDs are provided to the PC 200 in S402, the MFP 100 may append identifying information which represents the SSIDs respectively to the SSIDs so that the PC 200 include the identifying information corresponding to the selected SSID in the connection request in place of the SSID. The control unit 110 of the MFP 100 can identify the SSID based on the identifying information and attempt to establish connection with the external device represented by the SSID.

Further, the examination in the steps S404 and S422 may be carried out by the PC 200 in place of the MFP 100. Such configuration of the flow will be described hereinbelow in a third embodiment.

According to the above flow, specifically, the user can input selection of the SSID or directly enter the preferred SSID in S306 through the operation unit 230 of the PC 200, which has improved operability. Further, the password is entered through the operation unit 230 of the PC 200. It is to be noted that operability of the operation unit 230 of the PC 200 is generally better than operability of the operation unit 160 of the MFP 100. Therefore, the user's selection of the SSID and the password can be easily entered in the PC 200. Further, the collected SSIDs and the result of the attempts to establish connection are presented to the user through the display unit 240 of the PC 200, which has better visibility, in S306.

Next, a third embodiment of the wireless settings installation process to be executed in the MFP 100 and the PC 200 will be described with reference to FIGS. 9-12. The third embodiment of the wireless settings installation process is carried out in cooperation of the MFP 100 and the PC 200 which is connected to the MFP 100 via the USB interfaces 180, 250. In particular, the MFP 100 installs the wireless settings in the MFP 100 itself according to instructions provided by the PC 200. However, the round-robin adoptions in S426 carried out in the MFP 100 in the second embodiment are mainly carried out by the PC 200. The MFP 100 attempts to establish connection based on instructions from the PC 200 and transmits result of the attempt to the PC 200 on the basis of the attempt.

Figure 9:
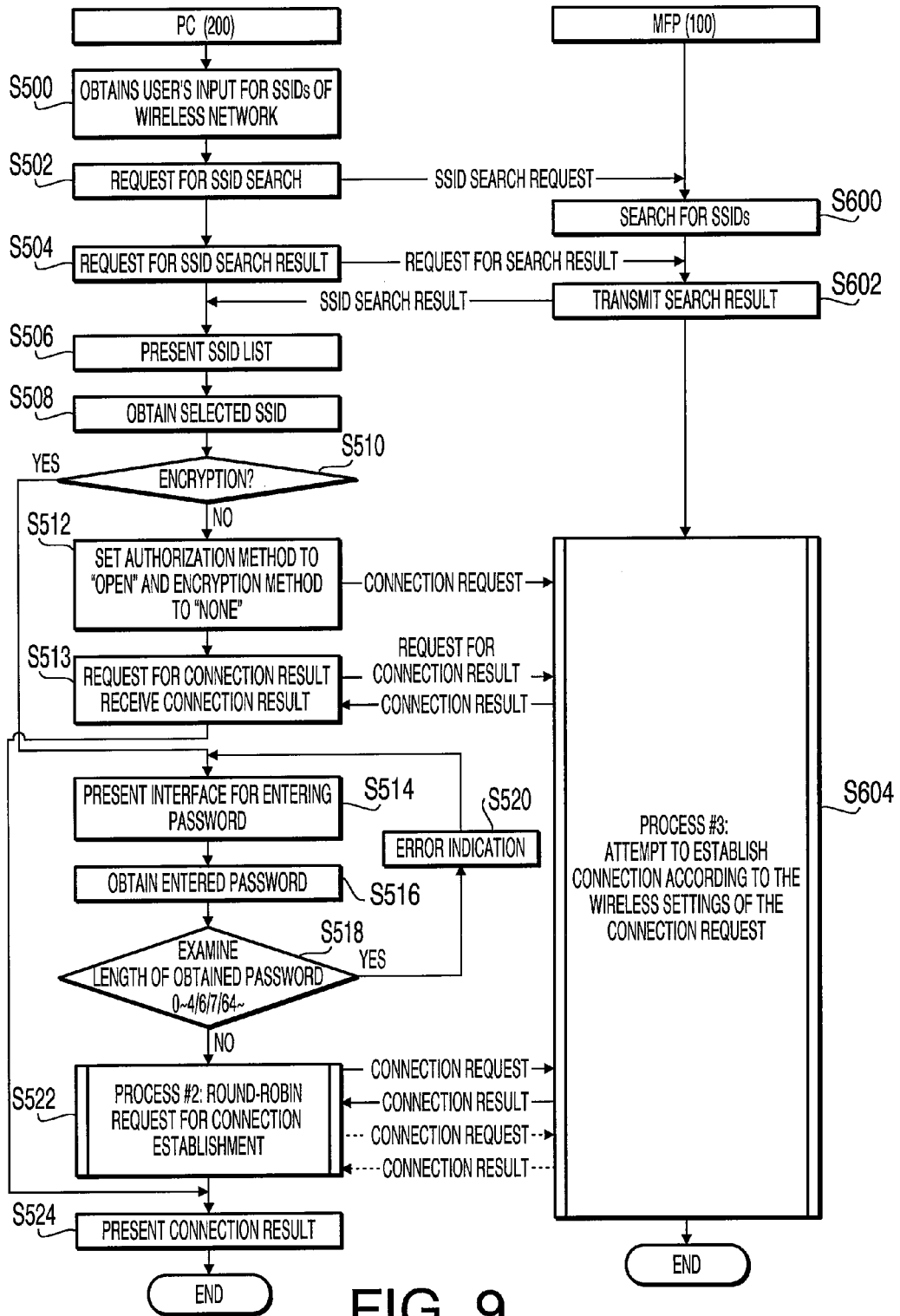
FIG. 9 is a flowchart to illustrate the wireless settings installation process according to a third embodiment of the present invention.

FIG. 9 is a flowchart to illustrate the wireless settings installation process according to the third embodiment of the present invention. The steps S500-S508 are identical with the steps S300-S308 in the wireless settings installation process according to the second embodiment and shown in FIG. 7; therefore, description of those is omitted. Further, the steps S600 and S602 are identical with the steps S400 and S402 in the wireless settings installation process according to the second embodiment and shown in FIG. 7; therefore, description of those is omitted.

In S510, the control unit 210 of the PC 200 examines as to whether the wireless network represented by the selected SSID employs an encryption method. The SSIDs provided by the MFP 100 respectively includes appended information to indicate employment of an encryption method in the wireless network to which the external device belongs. The control unit 210 refers to the appended information and determines employment of an encryption method based on the appended information. When the control unit 210 determines that the wireless network represented by the selected SSID does not employ any encryption method (S510: NO), the control unit 210 adopts the set of the authorization method being "open" and the encryption method being "none." In S512, the control unit 210 transmits a connection request to the MFP 100 through the USB interface 250 so that the MFP 100 should attempt to establish connection with the external device in the wireless network, which is represented by the SSID obtained in S508, in the wireless settings (i.e., the authorization method: "open" and the encryption method: "none."). The MFP 100 receiving the connection request performs a process to attempt establishing connection with the external device in S604, which will be described later in detail.

After transmitting the connection request to the MFP 100 in S512, the control unit 210 of the PC 200 waits for a predetermined length of period. Thereafter, in S513, the control unit 210 manipulates the USB interface 250 to transmit a request for result of attempts to establish connection with the external device to the MFP 100. When the result of attempts is received, the flow proceeds to S524.

In S510, when the control unit 210 determines that the wireless network represented by the selected SSID employs an encryption method (S510: YES), the flow proceeds to S514 and S516. The steps S514 and 516 are identical with the steps S312 and 314 in the wireless settings installation process according to the second embodiment and shown in FIG. 8; therefore, description of those is omitted. In S518, the control unit 110 examines as to whether the character count of the password, which was obtained in S516, is any of 0-4, 6, 7, 64 or greater than 64. When the character count is any of 0-4, 6, 7, 64 or greater than 64, the password is determined to be incorrect (see Table 1).

If the count of characters included in the obtained password is any of 0-4, 6, 7, 64 and more than 64, i.e., when the count of characters is not any of 5 or 8-63 (S518: YES), the control unit 210 determines that the entered password is incorrect. Therefore, in S520, the control unit 210 presents a message indicating that the password is incorrect to the user through the display unit 240 and returns to S514. Thus, the user is again prompted to enter a password. In this regard, the flow may be terminated when the flow S514-S520 is repeated for a predetermined number times (e.g., 3 times), i.e., when the user enters incorrect passwords for the predetermined number of times.

In S516, if the count of characters included in the obtained password is not any of 0-4, 6, 7, 64 and more than 64, i.e., when the count of characters is any of 5 or 8-63 (S518: NO), the flow proceeds to S522. In S522, the control unit 210 manipulates the USB interface 250 to transmit connection requests to the MFP 100 and requests the MFP 100 to attempt establish connection with the external device in the wireless network represented by the SSID, which was obtained in S508. In this step, the control unit 210 requests the MFP 100 to attempt establishing connection with the external device according to the respective sets of the wireless settings, i.e., the authorization method and the encryption method, the SSID obtained in S508, and the password obtained in S516. Detailed behavior of the control unit 210 in S522 will be described later.

When the connection request is transmitted to the MFP 100, the control unit 110 of the MFP 100 manipulates the USB interface 180 to receive the connection request. In S604, the control unit 110 attempts to establish connection with the external device in response to the connection request from the PC 200. Further, the control unit 110 manipulates the USB interface 250 to transmit result of the attempts to the PC 200. Detailed behavior of the control unit 110 in S604 will be described later.

The control unit 210 of the PC 200 manipulates the USB interface 250 to receive the result of the attempts, and the flow proceeds to S524. In S524, the control unit 210 presents one of the result of attempt to establish connection obtained in S513 and the result of attempt to establish connection obtained in S522 to the user through the display unit 240. The flow ends thereafter.

The detailed behaviors of the control unit 210 of the PC 200 in S522 will be described with reference to FIGS. 10 and 11. The flow of behaviors in S522 will be also referred to as Process #2 in the present embodiment. When the flow starts, in S700, the control unit 210 examines as to whether the wireless network represented by the SSID, which was obtained in S508, operates in the infrastructure mode. In this step, the control unit 210 specifically examines information appended to the SSID, which was obtained by the control unit 110 of the MFP 100 from the external device in S600 through the wireless interface 120. The appended information indicates the communication mode of the wireless network, which is one of the infrastructure mode and the ad-hoc mode. The appended information is passed to the PC 200 along with the SSID when the search result is transmitted to the PC 200 in S602. Therefore, the control unit 210 refers to the appended information in order to determine the communication mode of the wireless network represented by the SSID obtained in S508.

When the control unit 210 determines that the communication mode is the ad-hoc mode (S700: NO), the flow proceeds to S734 (see FIG. 11). When the communication mode is the infrastructure mode (S700: YES), the flow proceeds to S702.

In S702, the control unit 210 examines as to whether the character count of the password, which was obtained in S516, is greater than or equal to 8, or smaller than or equal to 63. A method to examine the character count in S702 is identical with S202 in the wireless settings installation process according to the first embodiment and shown in FIG. 5; therefore, description of those is omitted.

In S702, if the control unit 210 determines that the character count of the password is not greater than or equal to 8, or smaller than or equal to 63 (S702: NO), the flow proceeds to S728 (FIG. 11). If the control unit 210 determines that the character count of the password is greater than or equal to 8, or smaller than or equal to 63 (S702: YES), in S704, the control unit 210 adopts the set: "WPA2 and AES" for the authorization method and the encryption method to be the wireless settings, in which the control unit 110 of the MFP 100 will attempt to establish connection with the external device. Further, the control unit 210 transmits a connection request to the MFP 100 through the USB interface 250 so that the MFP 100 will attempt to establish connection with the external device according to the wireless settings: i.e., the authorization method being WPA2, the encryption method being AES, the SSID obtained in S508, and the password obtained in S516. Thereafter, in S706, the control unit 210 transmits a request for result of the attempt to the MFP 100 and receives the result.

In S708, it is examined as to whether the connection is established. When the result indicates failure of the attempt (S708: NO), in S710, the control unit 210 adopts the next set of the authorization method and the encryption method: "WPA2 and TKIP." Further, the control unit 210 transmits a connection request to the MFP 100 to attempt establishing connection with the external device according to the wireless settings (i.e., the authorization method being WPA2, the encryption method being TKIP, the SSID obtained in S508, and the password obtained in S516). Thereafter, in S712, the control unit 210 transmits a request for result of the attempt to the MFP 100 and receives the result.

In S714, it is examined as to whether the connection is established. When the result indicates failure of the attempt (S714: NO), in S716, the control unit 210 adopts the next set of the authorization method and the encryption method: "WPA and AES." Further, the control unit 210 transmits a connection request to the MFP 100 to attempt establishing connection with the external device according to the wireless settings (i.e., the authorization method being WPA, the encryption method being AES, the SSID obtained in S508, and the password obtained in S516). Thereafter, in S718, the control unit 210 transmits a request for result of the attempt to the MFP 100 and receives the result.

In S720, it is examined as to whether the connection is established. When the result indicates failure of the attempt (S720: NO), in S722, the control unit 210 adopts the next set of the authorization method and the encryption method: "WPA and TKIP." Further, the control unit 210 transmits a connection request to the MFP 100 to attempt establishing connection with the external device according to the wireless settings (i.e., the authorization method being WPA, the encryption method being TKIP, the SSID obtained in S508, and the password obtained in S516). Thereafter, in S724, the control unit 210 transmits a request for result of the attempt to the MFP 100 and receives the result.

In S726, it is examined as to whether the connection is established. When the result indicates failure of the attempt (S726: NO), the flow proceeds to S728 (FIG. 11).

In S728, the control unit 210 adopts the next set of the authorization method and the encryption method: "Shared-key and WEP." Further, the control unit 210 transmits a connection request to the MFP 100 to attempt establishing connection with the external device according to the wireless settings (i.e., the authorization method being Shared-key, the encryption method being WEP, the SSID obtained in S508, and the password obtained in S516). Thereafter, in S730, the control unit 210 transmits a request for result of the attempt to the MFP 100 and receives the result.

In S732, it is examined as to whether the connection is established. When the result indicates failure of the attempt (S732: NO), in S734, the control unit 210 adopts the next set of the authorization method and the encryption method: "open and WEP." Further, the control unit 210 transmits a connection request to the MFP 100 to attempt establishing connection with the external device according to the wireless settings (i.e., the authorization method being open, the encryption method being WEP, the SSID obtained in S508, and the password obtained in S516). Thereafter, in S736, the control unit 210 transmits a request for result of the attempt to the MFP 100 and receives the result.

In S738, it is examined as to whether the connection is established. When the result indicates failure of the attempt (S738: NO), Process #2 ends, and the flow returns to S700. Thereafter, the control unit 210 repeats S700 and the succeeding steps in the background operation.

Meanwhile, in any of S708, S714, S720, S726, S732, and S738, if the result of attempt to establish connection with the external device indicates successful establishment of connection (S708: YES, S714: YES, S720: YES, S726: YES, S732: YES, or S738: YES), Process #2 in S522 (FIG. 9) ends and proceeds to S524.

In S738, if the result of attempt to establish connection indicates failure of the attempt (S738: NO), the control unit 210 repeats S700 and the succeeding steps in the background operation. In this regard, the control unit 210 carries out S524 to present a message indicating the failure of the attempt to the user through the display unit 240. When connection with the external device is established (e.g., in S708) whilst the flow in S700-S738 is repeated in the background operation (S708: YES), in S524, the control unit 210 present a message indicating successful establishment of the connection to the user through the display unit 240.

Figure 10:
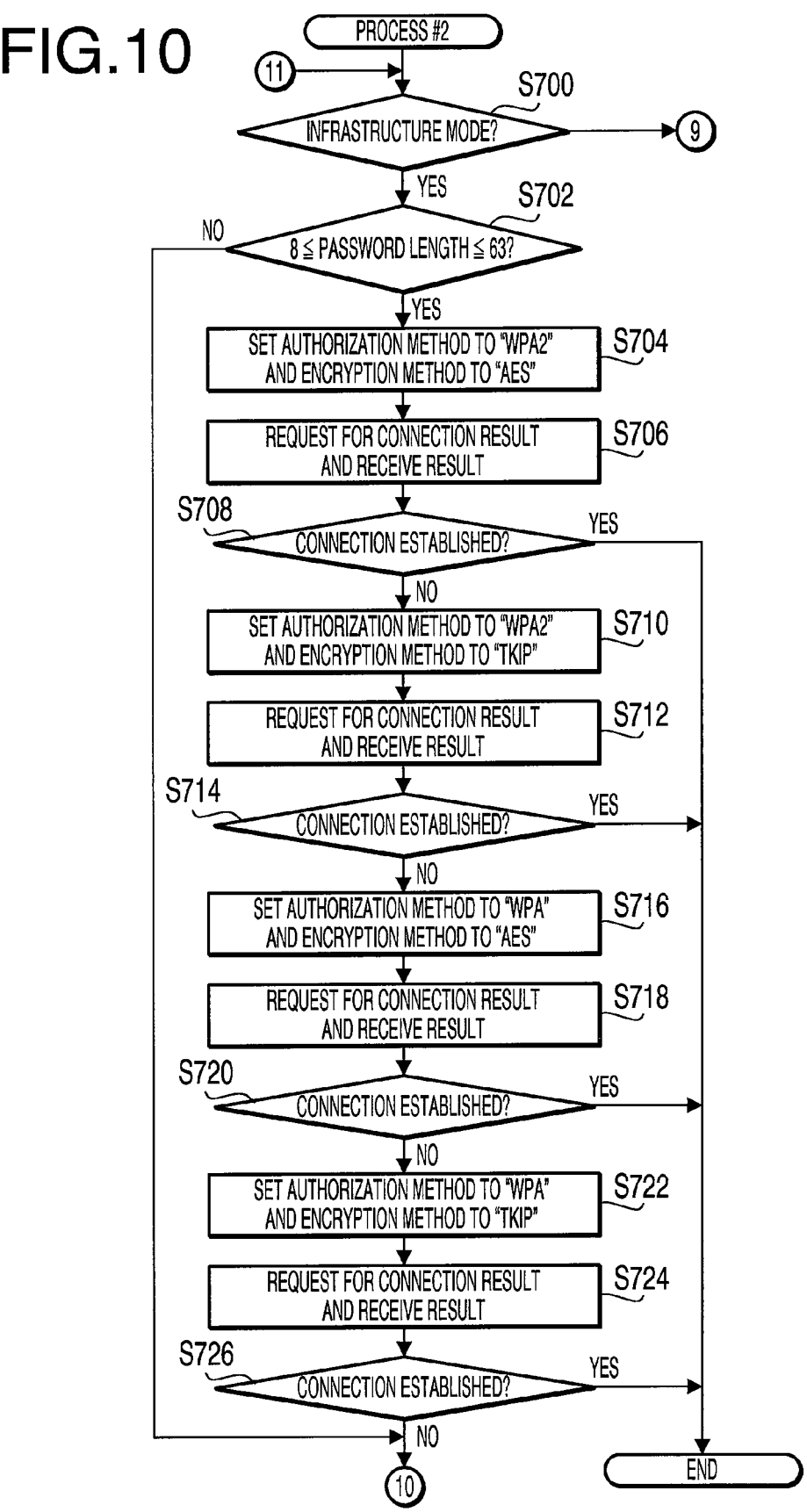
FIG. 10 is a flowchart to illustrate a detailed flow of issuing round-robin requests for establishing connection to the MFP 100 according to the third embodiment of the present invention.
Figure 11:
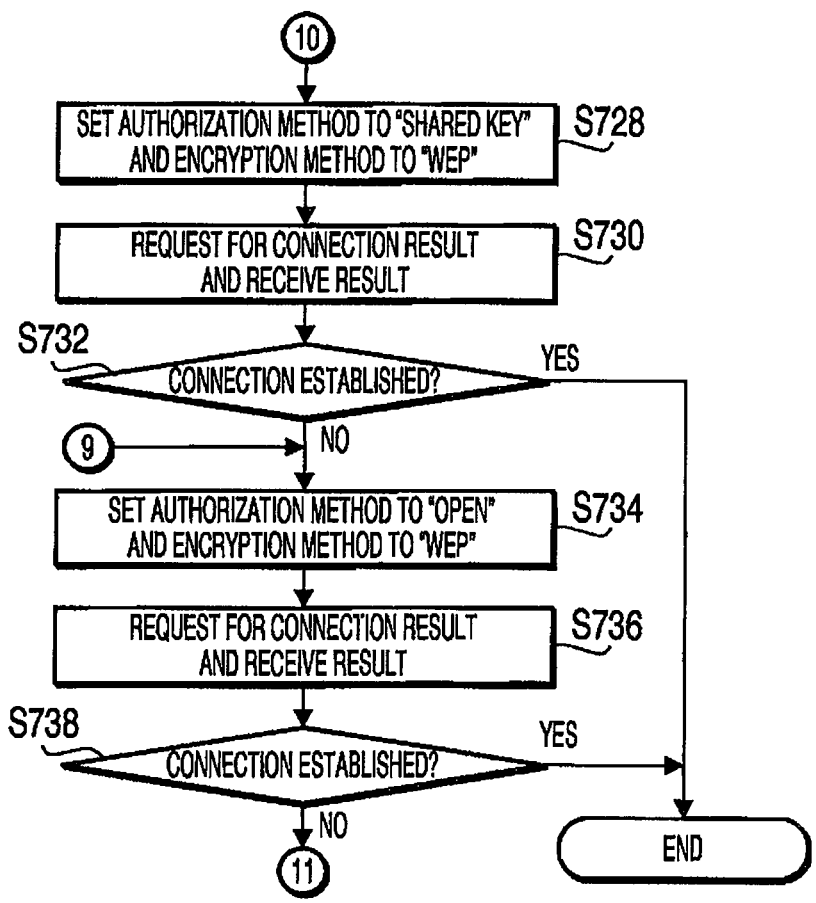
FIG. 11 is a flowchart to illustrate the detailed flow of issuing round-robin requests for establishing connection to the MFP 100 according to the third embodiment of the present invention.

If the flow in S700-S738 is repeated in the background operation for a predetermined number of times, but result indicating successful establishment of connection is not received, the control unit 110 may terminate the flow shown in FIGS. 10 and 11.

In the above embodiment, the connection request at least includes the set of the authorization method and the encryption method, and the password. In this regard, the connection request may include the SSID. However, the SSID may not necessarily be included in the connection request. When the SSID is not included, similarly to the connection request described in the second embodiment, the connection request includes identifying information which identifies the SSID.

Figure 12:
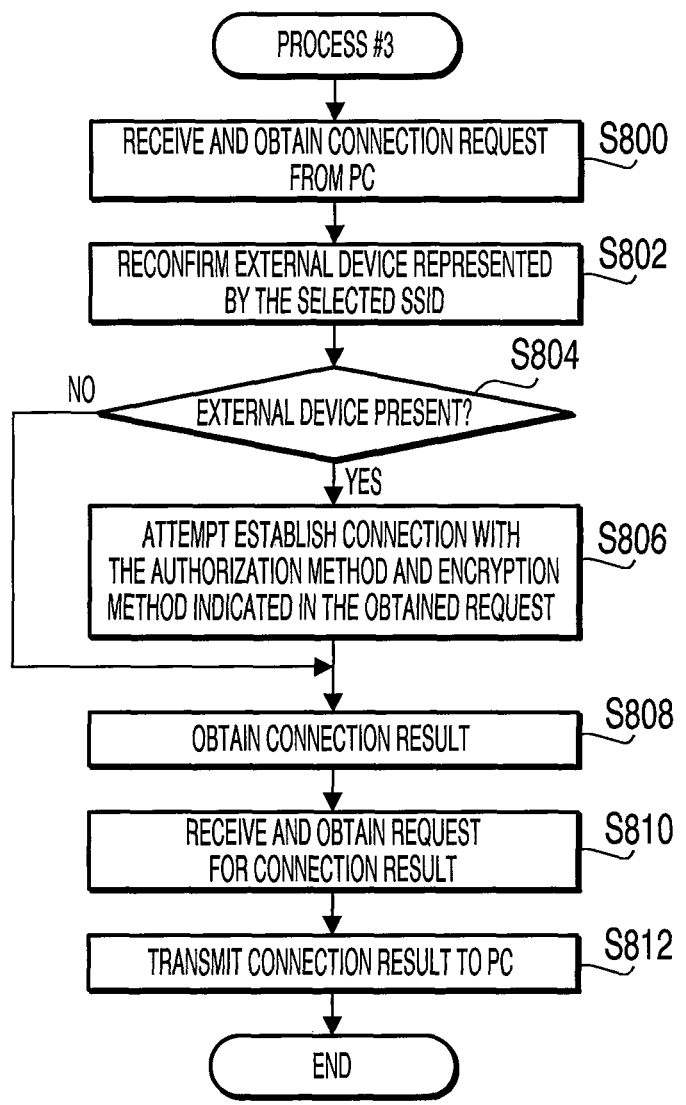
FIG. 12 is a flowchart to illustrate a detailed flow of attempt to establishing connection between the MFP 100 and the external device within the wireless network 10 according to the third embodiment of the present invention.

Next, detailed behavior of the control unit 110 of the MFP 100 in S604 will be described with reference to FIG. 12. The flow of behaviors in S604 will be also referred to as Process #3. When the flow starts, in S800, the control unit 110 of the MFP 100 receives and obtains the connection request, which is transmitted from the PC 200 in one of S704, S710, S716, S722, S728, and S734, through the USB interface 180. In S802, the control unit 110 examines as to whether the external device provided the SSID selected in S508 remains in the wireless network. In other words, it is reconfirmed that the external device which provided the SSID remains active in the wireless network. The method to detect presence of the external device is the same with that used in S122 (FIG. 3) in the first embodiment. In S804, if the external device is not detected (S804: NO), the flow proceeds to S808 and obtains result indicating failure of connection establishment.

In S804, if the external device is detected (S804: YES), in S806, the control unit 110 attempts to establish connection with the external device in the wireless network according to the wireless settings (i.e., the authorization method and the encryption method obtained in S800, the SSID obtained in S508, and the password obtained in S516). In this regard, however, if the connection request received in S800 is transmitted from the PC 200 in S512 (FIG. 9), the password is not included. In S808, the control unit 110 obtains result of the attempt. The control unit 110 determines the result of the attempt based on, for example, data transmitted from the external device. When no response is transmitted from the external device within a predetermined length of period, the control unit 110 may determine that the attempt failed. When the connection is established, the control unit 110 reserves the wireless settings used in the attempt in the storage unit 130.

In S810, the control unit 110 manipulates the USB interface 180 to receive the request for the result of the attempt, which is transmitted from the PC 200 in one of S706, S712, S718, S724 (FIG. 10), S730, and S736 (FIG. 11). In S812, the control unit 110 transmits the result of the attempt to the PC 200. Process #3 ends thereafter.

According to the above embodiment, specifically, the PC 200 connected to the MFP 100 via the USB interfaces 180, 250 adopts the set of the authorization method and the encryption method to be attempted for connection establishment. Thus, the connection request, which requests for establishment of connection in the wireless settings of the adopted set including the authorization method and the encryption method, is passed to the MFP 100 (S522 and S604). The MFP 100 is required to attempt establishing connection according to the ready-adopted wireless settings; therefore, the MFP 100 is released from the workload to select the wireless settings for the attempts.

Although examples of carrying out the invention has been described, those skilled in the art will appreciate that there are numerous variations and permutations of the wireless communication device, the method and the computer usable medium storing computer readable instructions to connect the wireless communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiments, the sets of the authorization method and the encryption method are attempted in the order of "WPA2 and AES," "WPA2 and TKIP," "WPA and AES," "WPA and TKIP," "Shared-key and WEP," and "open and WEP." In this order, the authorization method and the encryption method are adopted sequentially on the basis of the authorization method rather than the encryption method. In particular, a set having an encryption method with security of a higher level is adopted earlier than a set having an encryption method with security of a lower level between the sets having the same authorization method. For example, between "WPA2 and AES" and "WPA" and TKIP", the set "WPA2 and AES" is adopted preferentially over the set "WPA" and TKIP."

However, the set may be adopted on the basis of the encryption method rather than the authorization method. For example, the sets may be adopted in the order of "WPA2 and AES," "WPA and AES," "WPA2 and TKIP," and "WPA and TKIP." In this order, a set having an authorization method with higher-leveled security is adopted earlier than a set having an authorization method with lower-leveled security between the sets having the same encryption method. For example, between "WPA2 and AES" and "WPA" and AES", the set "WPA2 and AES" is adopted preferentially over the set "WPA" and AES."

The order may be therefore determined based on preferences. However, for example, when an access point is capable of operating in a plurality of sets of authorization methods and encryption methods, the access point is generally configured to establish communication according to the set of wireless settings with higher-leveled security. Therefore, if the attempts to establish connection with the access point in the order of security levels (i.e., higher to lower), it is likely that the connection is established earlier compared to attempts to establish connection in the reverse order.

What is claimed is:

1. A wireless communication device comprising:
a processor; and
memory storing computer readable instructions that, when executed, cause the wireless communication device to perform:
  determining whether encryption is used in communication in a wireless network or not;
  obtaining a password designated by a user for connecting the wireless communication device to the wireless network upon determining that encryption is used in communication in the wireless network; and
  connecting the wireless communication device to the wireless network using the obtained password,
  wherein connecting the wireless communication device to the wireless network includes:
    identifying a plurality of sets of information, each set of the plurality of sets of information having an authorization method and an encryption method, wherein the plurality of sets of information are identified independently of at least one of a specific authorization method and a specific encryption method used for communication in the wireless network, wherein obtaining the password is performed prior to identifying any of the plurality of sets of information,
    upon identifying the plurality of sets of information:
      sequentially selecting one set of information from the plurality of sets of information, and
      sequentially attempting to connect the wireless communication device to the wireless network using the obtained password and the sequentially selected one set of information, wherein sequentially attempting to connect the wireless communication device includes:
        attempting to connect the wireless communication device to the wireless network using the obtained password and a first selected set of information, and
        after attempting to connect the wireless communication device using the first set of information selected previously, attempting to connect the wireless communication device to the wireless network using the obtained password and a second selected set of information, the second selected set of information being selected for a connection attempt after the first selected set of information.

2. The wireless communication device according to claim 1, wherein the plurality of sets of information include:
   a first set of information having a first authorization method and a first encryption method; and
   a second set of information having the first authorization method and a second encryption method with a security level lower than a security level of the first encryption method; and
   wherein sequentially selecting one set of information from a plurality of sets of information includes selecting the first set of information prior to selecting the second set of information.

3. The wireless communication device according to claim 1, wherein the plurality of sets of information include:
   a first set of information having a first authorization method and a first encryption method; and
   a second set of information having a second authorization method with a security level lower than a security level of the first authorization method and the first encryption method,
   wherein sequentially selecting one set of information from a plurality of sets of information includes selecting the first set of information prior to selecting the second set of information.

4. The wireless communication device according to claim 1,
   wherein sequentially selecting one set of information from the plurality of sets of information is performed until the connection is established; and
   wherein sequentially selecting one set of information from the plurality of sets of information is repeated if all attempts to establish a connection using the plurality of sets of information fail.

5. The wireless communication device according to claim 1, wherein the computer readable instructions, when executed, further cause the wireless communication device to perform:
   determining whether a count of characters included in the obtained password is equal to a predetermined number; and
   prompting the user to re-designate a password upon determining that the count of characters included in the obtained password is different from the predetermined number.

6. The wireless communication device according to claim 1, wherein a password is not obtained upon determining that the communication in the wireless network is not encrypted; and
   wherein, upon determining that the communication in the wireless network is not encrypted, the wireless communication device is caused to select a specified set of information having open authorization as the authorization method and no encryption as the encryption method and attempting to connect the wireless communication device to the wireless network using the specified set of information.

7. The wireless communication device according to claim 1, wherein the wireless communication device is further caused to perform:
   obtaining a network identifier designated by the user, the network identifier identifying the wireless network,
   wherein the wireless communication device connects to the wireless network identified by the network identifier.

8. A method comprising:
   determining, by a wireless communication device, whether encryption is used in communication in a wireless network;
   obtaining a password designated by a user for connecting the wireless communication device to the wireless network upon determining that encryption is used in the communication in the wireless network; and
   connecting, by the wireless communication device, to the wireless network using the obtained password,
   wherein connecting to the wireless network using the obtained password includes:
     identifying, by the wireless communication device, a plurality of sets of information, each set of information of the plurality of sets of information having an authorization method and an encryption method, wherein the plurality of sets of information are identified independently of at least one of a specific authorization method and a specific encryption method used for communication in the wireless network, wherein obtaining the password is performed prior to identifying any of the plurality of sets of information;
     upon identifying the plurality of sets of information:
       sequentially selecting one set of information from the plurality of sets of information, and
       sequentially attempting to connect to the wireless network using the obtained password and the sequentially selected one set of information, wherein sequentially attempting to connect the wireless communication device includes:
         attempting to connect the wireless communication device to the wireless network using the obtained password and a first selected set of information, and
         after attempting to connect the wireless communication device using the first set of information selected previously, attempting to connect the wireless communication device to the wireless network using the obtained password and a second selected set of information, the second selected set of information being selected for a connection attempt after the first selected set of information.

9. A non-transitory computer usable medium comprising computer readable instructions that, when executed, cause a wireless communication device to:
   determine whether encryption is used in communication in a wireless network;
   obtain a password designated by a user for connecting the wireless communication device to the wireless network upon determining that encryption is used in the communication in the wireless network; and
   connect to the wireless network using the obtained password,
   wherein connecting to the wireless network using the obtained password includes:
     identifying a plurality of sets of information, each set of information of the plurality of sets of information having an authorization method and an encryption method, wherein the plurality of sets of information are identified independently of at least one of a specific authorization method and a specific encryption method used for communication in the wireless network, wherein obtaining the password is performed prior to identifying any of the plurality of sets of information;

upon identifying the plurality of sets of information:
sequentially selecting one set of information from the plurality of sets of information, and
sequentially attempting to connect to the wireless network using the obtained password and the sequentially selected one set of information, wherein sequentially attempting to connect the wireless communication device includes:
attempting to connect the wireless communication device to the wireless network using the obtained password and a first selected set of information, and
after attempting to connect the wireless communication device using the first set of information selected previously, attempting to connect the wireless communication device to the wireless network using the obtained password and a second selected set of information, the second selected set of information being selected for a connection attempt after the first selected set of information.

10. The wireless communication device of claim 1, wherein the plurality of sets of information are identified independently of both of the specific authorization method and the specific encryption method used for communication in the wireless network.

11. The wireless communication device of claim 1, wherein the plurality of sets of information are identified based on a character count of the obtained password.

* * * * *